United States Patent [19]
Rump et al.

[11] Patent Number: 5,535,123
[45] Date of Patent: Jul. 9, 1996

[54] METHOD FOR CONTROLLING THE TRIGGERING SENSITIVITY OF A VEHICLE AUTOMATIC BRAKING PROCESS TO MATCH DRIVER BEHAVIOR

[75] Inventors: Siegfried Rump, Weinstadt, Germany; Manfred Steiner, Winnenden; Brian Douglas, Stuttgart, all of Germany

[73] Assignee: Mercedes-Benz AG, Germany

[21] Appl. No.: 337,429

[22] Filed: Nov. 8, 1994

[30] Foreign Application Priority Data

Nov. 8, 1993 [DE] Germany .......................... 43 38 068.9

[51] Int. Cl.$^6$ ...................................................... B60T 7/06
[52] U.S. Cl. ..................................... 364/426.02; 303/155
[58] Field of Search ........................ 364/426.01, 426.03, 364/426.02; 303/155, 160, 166, 113.4

[56] References Cited

U.S. PATENT DOCUMENTS

| | | | |
|---|---|---|---|
| 5,084,821 | 1/1992 | Ohsuga et al. | 364/424.05 |
| 5,158,343 | 10/1992 | Reichlt et al. | 303/113 SS |
| 5,350,224 | 9/1994 | Nell et al. | 303/113.3 |
| 5,350,225 | 9/1994 | Steiner et al. | 303/113.4 |
| 5,427,442 | 6/1995 | Heibel | 303/114.3 |
| 5,492,397 | 2/1996 | Steiner et al. | 303/157 |

*Primary Examiner*—Michael Zanelli
*Attorney, Agent, or Firm*—Evenson, McKeown, Edwards & Lenahan

[57] ABSTRACT

A method is disclosed for controlling the triggering sensitivity of an automatic braking process for a motor vehicle based on the driving behavior of an individual driver. A predetermined fixed threshold value of the actuation speed of the brake pedal is multiplied by a driver-dependent factor which is determined after each braking process, as a function of the actuation speed and of the pedal travel of the brake pedal, to generate a driver-dependent threshold for actuation of automatic braking.

10 Claims, 2 Drawing Sheets

METHOD FOR CONTROLLING THE TRIGGERING SENSITIVITY OF A VEHICLE AUTOMATIC BRAKING PROCESS TO MATCH DRIVER BEHAVIOR

BACKGROUND AND SUMMARY OF THE INVENTION

The invention relates to a method for determining the triggering sensitivity of an automatic braking process for a motor vehicle, dependent on the driving behavior of an individual driver.

An automatic braking process of the generic type is disclosed, for example, in German patent document DE 40 28 290 C1, in which automatic braking in a motor vehicle is triggered whenever the actuation speed of the brake pedal exceeds a prescribed threshold value. In automatic braking, brake pressure is generated which is greater than a brake pressure corresponding to the position of the brake pedal.

In the non-prepublished Patent Application DE-P. 43 25 940.5 the triggering sensitivity of the automatic braking process is determined by the speed of the vehicle and the position of the brake pedal. According to this disclosure, it is possible to match the triggering of the automatic braking process to the vehicle in itself by suitably selecting the threshold value, and to the current driving state—speed of the vehicle and position of the brake pedal. However, because triggering of the system is not adapted to the behavior of the individual driver, in the case of drivers who actuate the brake pedal only hesitantly, automatic braking may not be triggered in a situation in which triggering would actually be desirable. On the other hand, in the case of drivers who actuate the brake pedal violently even in a normal driving mode, automatic braking may be- triggered unnecessarily, in driving situations in which it is not desired.

It has been proposed, therefore, to provide a control element which can be actuated by the driver to adjust the triggering sensitivity of the automatic braking process within a specific range. The actuation of such a control element by the drivers of vehicles is not, however, absolutely reliable. Moreover, it is difficult for drivers to estimate or determine themselves the triggering sensitivity which is suitable for them.

The object of the invention is to improve the automatic braking process on which the generic type is based, with automatic adaptation of the triggering sensitivity of the system to the behavior of the driver.

This object is achieved by the automatic braking process according to the invention, in which a prescribed fixed threshold value Sf of the actuation speed of the brake pedal which triggers automatic braking is multiplied by a driver-dependent factor F, which is determined after each braking process as a function of the actuation speed and pedal travel of the brake pedal, in order to generate a driver-dependent threshold value Seff for triggering automatic braking. Thus, on the one hand, continuous adaptation to the driving behavior of the driver is ensured, while on the other hand, sufficient damping is ensured by taking into account all previous braking operations since the last resetting of the factor to an initial value. One simple way of detecting whether a braking process has been terminated consists, for example, in monitoring the switched position of the brake light switch.

Other objects, advantages and novel features of the present invention will become apparent from the following detailed description of the invention when considered in conjunction with the accompanying drawings.

DETAILED DESCRIPTION OF THE DRAWINGS

Figure 1:
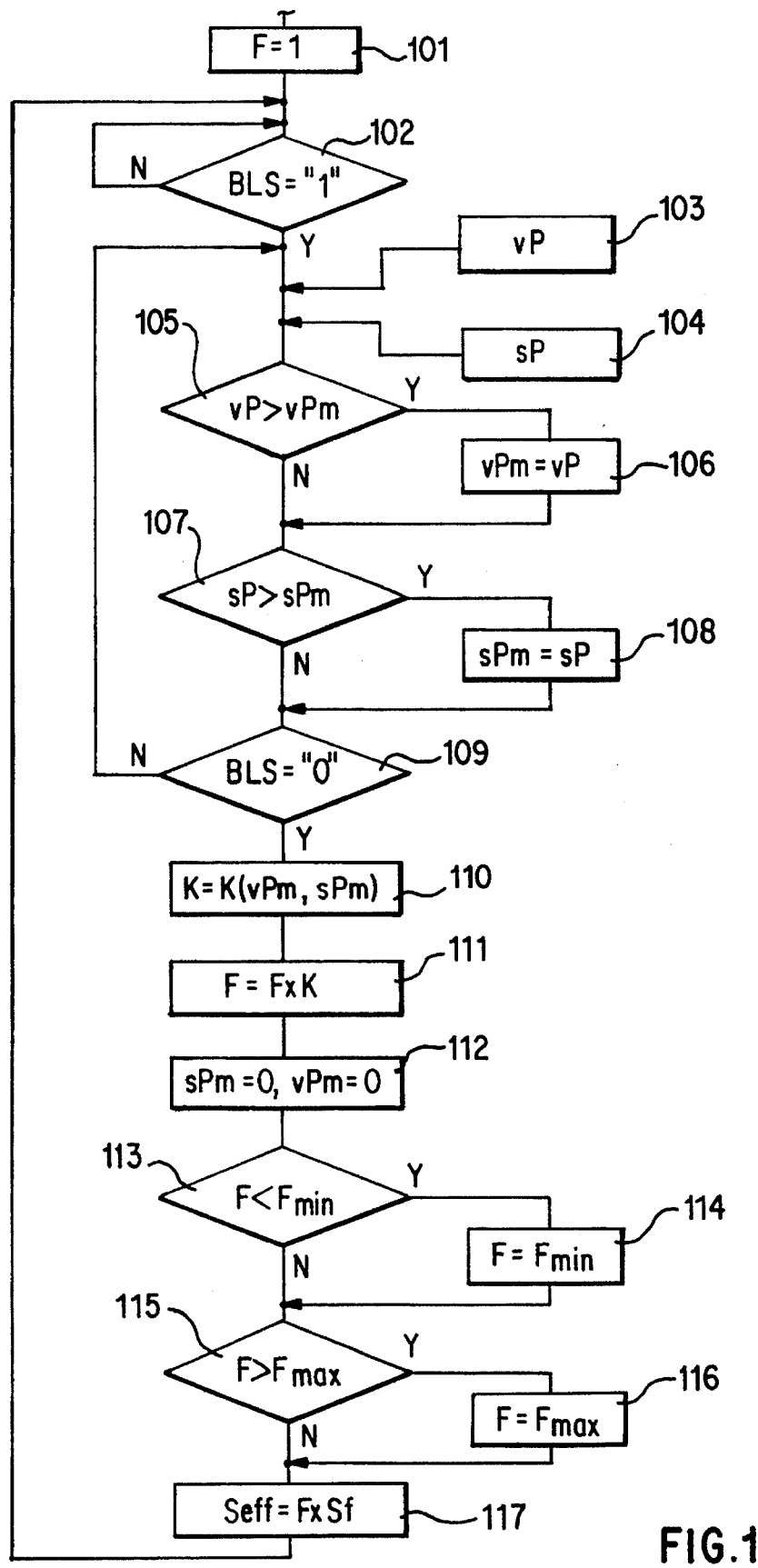
FIG. 1 shows the flow diagram of a method according to the invention.

FIG. 1 shows a flow diagram for the method according to the invention. In step 101, which is carried out only once after each time the vehicle is started, the driver-dependent factor F is reset to the value 1. The subsequent method steps form a closed loop.

In step 102, it is determined via the signal Bls of the brake light switch whether a braking operation has begun or not. (As long as a braking operation has not begun, the signal Bls has the value "zero".) This step is repeated until the brake pedal is actuated, at which time the start of a braking process is detected and the signal Bls thus assumes the value of "one". The method steps 103 to 108 are then carried out in a loop until termination of the braking operation is detected in step 109 by virtue of the signal Bls returning to "zero".

In steps 103 and 104, stored measured values for the brake pedal actuation speed vP and travel sP which have been realized are read in. The values of vP and sP are measured and stored in a conventional manner. Measurement of sP, for example, may be performed by measuring the travelled angle of actuation of the brake pedal by means of known angle measuring devices, and vP is easily measured as the time derivation of sP.

In step 105, it is determined whether the value of the actuation speed vP which has just been read in is greater than the maximum actuation speed vPm measured during the present braking operation. If so, in step 106 the maximum actuation speed vPm is set equal to the value vP. In step 107, it is tested whether the value of the pedal travel sP which has just been read in is greater than the maximum pedal travel sPm measured during the previous braking operation. If so, in step 108 the maximum pedal travel sPm is set equal to the value sP.

Instead of the actuation speed vP, in a further embodiment of the invention the quotient of the actuation speed vP and the threshold value Seff (see below) can also be used. In this case, the threshold value Seff may be determined not only according to this invention but also, for example, according to the German patent document DE-P. 43 25 940.5, dependent on the pedal travel sP which has already been realized, the reduction in the actuation speed vP which occurs as a result of the brake pressure which increases as the pedal travel sP progresses can be taken into account.

Figure 2:
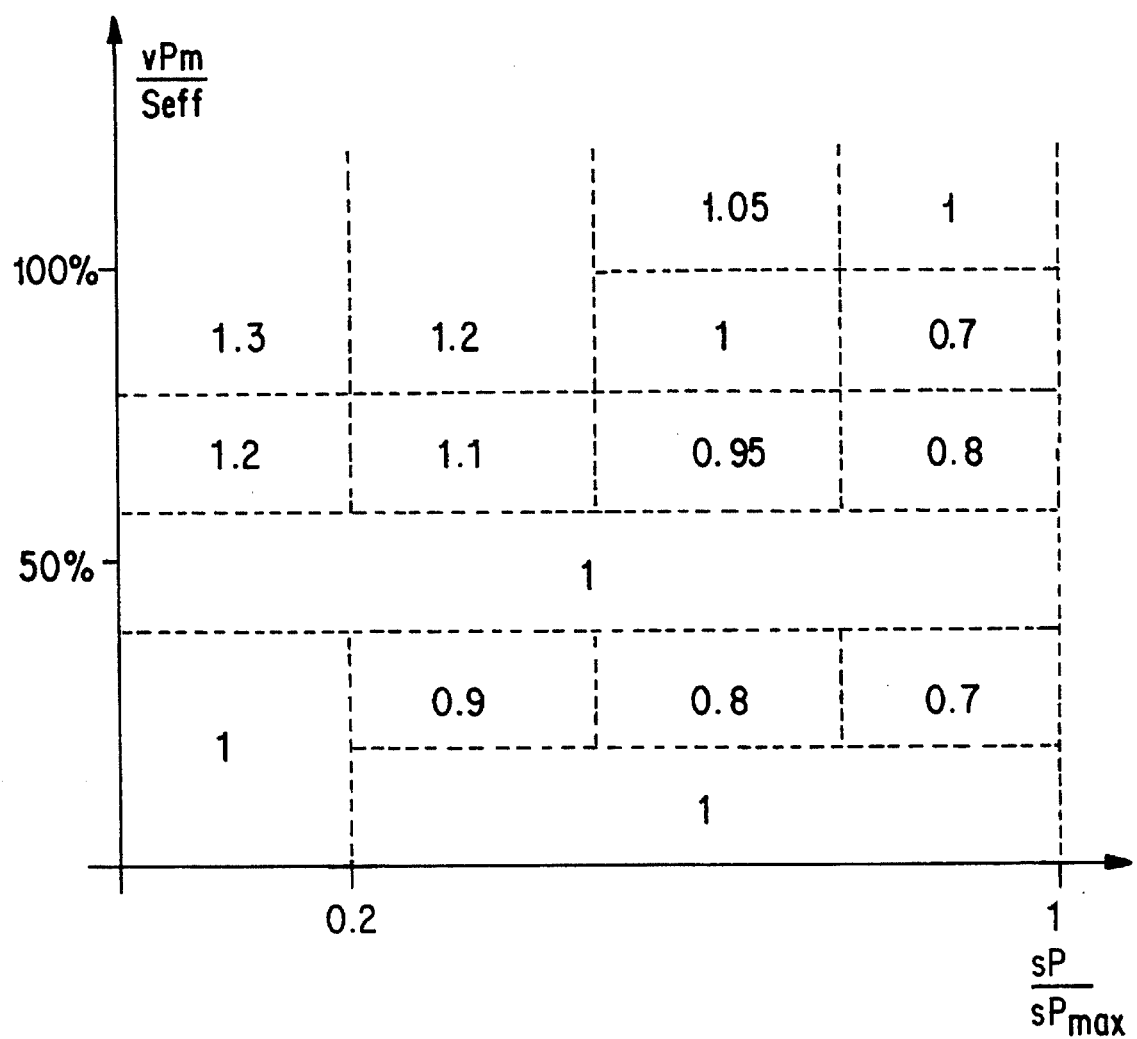
FIG. 2 shows a characteristic diagram of the method according to the invention.

After termination of the braking operation has been detected in step 109, in step 110 the characteristic number k is determined (as illustrated in FIG. 2) on the basis of the values of the maximum actuation speed vPm and of the maximum pedal travel sPm. In step 111, a new driver-dependent factor F is calculated by multiplying the previous factor F by the characteristic number k. In step 112, the values of the maximum actuation speed vPm and the maximum pedal travel sPm are reset to zero.

In order to prevent an excessively low value for the threshold value Seff being produced (as described below), in step 113 it is determined whether the driver-dependent factor F is smaller than a prescribed minimum Fmin. If so, according to step 114 the prescribed minimum Fmin is used as driver-dependent factor F. (A possible value of the prescribed minimum, for example, is Fmin=0.9.) On the other hand, in order to prevent an excessively large value for the threshold value Seff being produced, in step 115 it is determined whether the driver-dependent factor F is greater than a prescribed maximum Fmax, and if so, according to step 116 the prescribed maximum Fmax is used as driver-dependent factor F. (A possible value of the prescribed maximum, for example, is Fmax=1.2.)

In step 117, the driver-dependent threshold value Seff is then determined by multiplying the driver-dependent factor F by the fixed threshold value Sf. Subsequently, the system returns to step 102.

FIG. 2 shows an example of a characteristic diagram for determining the characteristic number k from the maximum actuation speed vPm and the maximum pedal travel sPm. The travel ratio of maximum pedal travel sPm to maximum possible pedal travel sPmax is plotted on the abscissa, and the ratio of maximum pedal actuation speed vPm to the current value of the threshold value Seff is plotted on the ordinate. The characteristic number is entered in the appropriate boxes. The ratio variables and characteristics numbers given below are examples, and must be adapted to the respective conditions of the vehicle and to the selected fixed threshold value Sf.

Braking operations with a speed ratio of less than 0.2, or with a travel ratio of less than 0.2 and a speed ratio of less than 0.4, cannot be assigned to any specific driver behavior. In the case of such braking operations, the characteristic number k=1 is set so that there is no influence on the triggering sensitivity of the automatic braking process.

The characteristic number k=1 is also adopted when the speed ratio lies between 0.4 and 0.6 since it can be assumed that the driver is carrying out a controlled braking operation and the threshold value Seff is matched to the driver.

Braking operation with a travel ratio of greater than 0.2 and a speed ratio between 0.2 and 0.4 indicates that the threshold value can be reached by the driver only with difficulty. Characteristic numbers of less than 1 are adopted in order to reduce the threshold value Seff.

If speed ratios of greater than 0.6 with pedal travel values of less than 0.5 occur, it can be assumed that the threshold value Seff is too easily reached by the driver. Accordingly, characteristic numbers of greater than 1 ensure a corresponding increase in the threshold value Seff.

If both the travel ratio and the speed ratio are greater than 0.8, a braking operation is carried out which lies in the region of the desired triggering of the automatic braking process. The threshold value is then correctly selected if the quotient of speed ratio in relation to travel ratio is approximately equal to 1. The characteristic number k is then 1. If the quotient is significantly greater than 1, the driver-dependent factor is increased slightly and the characteristic number is somewhat greater than 1. In contrast, if the quotient is smaller than 1, it is concluded that a threshold value Seff which is too high is present. A characteristic number k of less than 1 is selected. Here, the characteristic number is smaller the greater the travel ratio and the greater the quotient.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for controlling triggering sensitivity of a vehicle automatic braking system of the type in which automatic braking is commenced when a threshold value for brake pedal actuation speed is exceeded, a brake pressure greater than that which corresponds to the position of the brake pedal being generated automatically after triggering of the automatic braking process, said method comprising the steps of:

after each operation of vehicle brakes, determining a driver-dependent factor (F) as a function of a previous value of the driver-dependent factor (F), and pedal actuation speed (vP) and pedal travel (sP) of the vehicle brake pedal in said operation of vehicle brakes; and multiplying said driver-dependent factor (F) by a predetermined fixed value (Sf) to determine a driver-dependent value (Seff) for said threshold value.

2. Method according to claim 1 wherein the driver-dependent factor (F) is calculated from the product of a previous value of said driver-dependent factor (F) and a characteristic number (k) which is determined as a function of pedal actuation speed (vP), measured during a last preceding braking process, and of the pedal travel (sP).

3. Method according to claim 2 wherein a maximum actuation speed (vPm) determined during a last preceding braking process is used to determine the characteristic number (k).

4. Method according to claim 3 wherein characteristic number (k) is determined as a function of the ratio of the maximum measured actuation speed (vPm) to said driver-dependent threshold value (Seff).

5. Method according to claim 2 wherein a maximum pedal travel (SPm) determined during the last preceding braking process is used to determined the characteristic number (k).

6. Method according to claim 2 wherein the characteristic number (k) is read from values stored in a characteristic diagram.

7. Method according to claim 1 wherein the driver-dependent factor (F) is reset to a value of 1 when the vehicle is started.

8. Method according to claim 1 wherein a minimum value (Fmin) and a maximum value (Fmax) for the driver-dependent factor (F) are prescribed.

9. Method according to claim 1 wherein occurrence of a braking process is determined in response to a switched position (Bls) of brake light switch of said vehicle.

10. Method according to claim 1 wherein occurrence of a braking process is detected by the travel exceeding or dropping below a prescribed travel threshold for the pedal travel (sP).

* * * * *